3,381,024
METHOD FOR DIRECTLY MANUFACTURING
ALKYLALUMINUM COMPOUNDS
Kiyoshi Toyoshima, Eiichi Ichiki, Hirosuke Ryu, and Akira Yashima, Niihama-shi, Japan, assignors to Sumitomo Chemical Company, Ltd., Osaka, Japan, a corporation of Japan
No Drawing. Filed July 8, 1964, Ser. No. 381,252
Claims priority, application Japan, July 12, 1963, 38/38,100
6 Claims. (Cl. 260—448)

ABSTRACT OF THE DISCLOSURE

A process for producing alkylaluminum compounds from inactive aluminum or an alloy thereof, an olefin and hydrogen by using as an activating agent for aluminum and a catalytic substance an organoaluminum compound represented by a general formula $R_2Al(OR')$ wherein R represents a member selected from the group consisting of alkyl and aralkyl radicals and R' represents a member selected from the group consisting of alkyl, aryl, aralkyl and alkaryl radicals.

---

This invention is concerned with a method for directly manufacturing trialkylaluminum, dialkylaluminum hydride or a mixture thereof (they are called herein alkylaluminum compounds) by allowing aluminum or an alloy containing the same to react with an olefin and hydrogen in one step in the presence of an organoaluminum compound containing an oxygen atom in the molecule.

K. Ziegler et al. have suggested a method in which an alkylaluminum compound was directly manufactured by the reaction of aluminum with an olefin and hydrogen in the presence of a trialkylaluminum or a dialkylaluminum halide (see, for example, Ann. der Chem., vol. 629, 1 (1960); U.S. Patent No. 2,835,689; British Patent No. 770,707; German Patent No. 1,048,276; Japanese patent publication No. 5710/1957), and a method in which dialkylaluminum hydride was manufactured by the reaction of aluminum with trialkylaluminum and hydrogen in the first step and the resulting dialkylaluminum hydride was then converted to trialkylaluminum in the second step by the reaction with an olefin. (See, for example, Japanese patent publication No. 927/1958.) In other words, for the manufacture of an alkylaluminum compound from aluminum, an olefin and hydrogen, it is necessary to conduct the reaction in the presence of a trialkylaluminum, a dialkylaluminum hydride or a dialkylaluminum halide as seed of multiplication of an alkylaluminum compound or a substance acting as a catalyst (which is called catalytic substance herein). Further, to secure speedy progress of the above mentioned reaction, it is necessary to employ active aluminum material from which aluminum oxide film firmly covering its surface has been removed. Namely, the reaction for producing an alkylaluminum compound does not proceed in the absence of the catalytic substance even employing the active aluminum material, and the reaction proceeds very slowly in the case when inactive aluminum is employed even in the presence of a catalytic substance. Accordingly, in the conventional method, inactive aluminum material is activated according to the known activation method in the first step and alkylaluminum compound is manufactured by the reaction of thus obtained active aluminum material with an olefin and hydrogen in the presence of a known catalytic substance such as an alkylaluminum compound and a dialkylaluminum halide in the second step.

As mentioned above, conventional methods for manufacturing alkylaluminum compounds have the disadvantage in that aluminum or an alloy containing the same can not be employed in the inactive state.

Thus, for the activation of inactive aluminum material, K. Ziegler et al. have suggested that the aluminum was finely divided or cut in a specific liquid prepared for the prevention from oxygen, for example, in a hydrocarbon solvent containing a small amount of an alkylaluminum compound, or that the aluminum in molten state was jetted into the specific liquid as mentioned above in the presence of an inert atmosphere. (See, for example, Ann. der Chemie vol. 629, 1 (1960).) However, such method has some difficulties from economical point of view, especially when carried out in a large scale continuous process.

Besides such mechanical activation method, Elmer et al. have suggested a method in which inactive aluminum was chemically activated prior to the reaction by heat-treatment under superatmospheric pressure of hydrogen in the presence of an organometallic compound, such as alkylaluminum, arylaluminum and alkylberyllium, or a metal hydride, such as aluminum hydride and calcium hydride, at least at 150° C. but below the ultimate decomposition temperature of the organometallic compound or the metal hydride. (See, for example, British Patent No. 808,705; Japanese patent publication No. 7,906/1959; U.S. Patent No. 2,921,876; British Patent No. 808,706; British Patent No. 808,707; Japanese Patent Publication No. 2,252/1959.)

The present inventors have, however, found that, when the activation was conducted using the activating agent as described above, the effectiveness was sufficiently high at an activating temperature higher than 190° C., but decreased rapidly as the temperature lowered below 190° C. While, experience informed the inventors that the activating agent itself was heat-decomposed at a temperature higher than 190° C. even under a superatmospheric pressure of hydrogen to isolate the metal from the agent. The heat-decomposition of the activating agent is unfavorable by reason of loss of the agent and inhibition of the reaction.

Also, Elmer et al. have suggested a method in which inactive aluminum was activated by heat-treatment in the presence of a dialkylaluminum halide. (See, for example Japanese patent publication No. 2,253/1959.) This method is appeared to be advantageous since there is no fear of deposit of aluminum at the heat-treatment as the dialkylaluminum halide is very stable to heat. However, when an alkylaluminum compound is manufactured by employing thus obtained activated aluminum, the contamination of the product alkylaluminum compound with the dialkylaluminum halide is inevitable unless it is conducted through such a complicated process as that the activated aluminum is separated from the dialkylaluminum halide without deactivating the activated aluminum. However, unless very expensive iodine is employed as an origin of the halogen, it is difficult to obtain a pure alkylaluminum compound from the mixture of an alkylaluminum compound and a dialkylaluminum halide by distillation, because the difference of boiling point between them is very small. Accordingly, when the contamination of a dialkylaluminum halide is to be avoided according to the purpose of the alkylaluminum compound, in general, a halogen element is removed in the form of a sodium halide by the reaction of expensive metallic sodium or sodium hydride with liquid product.

As obvious from the above-mentioned, the mechanical activation method and the chemical activation method, as suggested heretofore, have difficulties in that the former is not adaptable to a large scale process and is expensive, and the latter is not avoidable from the heat-decomposition of the activating agent or the purification of the liquid product.

Accordingly, one object of this invention is to provide a novel method for manufacturing alkylaluminum compounds which will avoid the above-mentioned difficulties, by employing as the catalytic substance an alkylaluminum compound containing an oxygen atom in the molecule which also have the action as the activating agent for inactive aluminum or alloy containing the same.

This and other objects will become apparent from the following description.

To accomplish these objects, the inventors provide a method for directly manufacturing alkylaluminum compounds in one step, which comprises allowing a member selected from the group consisting of aluminum and alloys containing the same to react with an olefin and hydrogen gas without especially preliminarily activating the member selected from the group consisting of aluminum and alloys containing the same, in the presence of an organoaluminum compound containing an oxygen atom in the molecule having the general formula of $R_2Al(OR')$, wherein R represents a member selected from the group consisting of alkyl and aralkyl radicals, and R' represents a member selected from the group consisting of alkyl, aryl, aralkyl and alkaryl radicals.

Furthermore, the inventors provide a method for directly manufacturing alkylaluminum compounds, which comprises contacting a member selected from the group consisting of aluminum and alloys containing the same, at a temperature of 100° to 200° C., with an organoaluminum compound having the general formula of $R_2Al(OR')$, wherein R and R' have the same meanings as above identified, thereby to activate the aluminum, and, thereafter, allowing the activated aluminum to react with an olefin and hydrogen gas in the presence of the said organoaluminum compound.

One of the advantageous points of the present invention is that the inactive aluminum or its alloy, which was so far considered difficult to employ as raw aluminum material, can be employed for the reaction of the manufacturing alkylaluminum compounds as it is without preliminary activation, by use of an above mentioned organoaluminum compound containing an oxygen atom in the molecule which has high heat-stability and activation ability as a catalytic substance.

In other words, the catalytic substances employed in the present invention, have high activation ability and can activate inactive aluminum material under the optimum condition for the reaction for producing alkylaluminum compounds. Further, the present catalytic substances also have the catalytic activity as the conventional alkylaluminum compounds do. Accordingly, a mixture of an alkylaluminum compound and the present catalytic substance can be obtained in one step, by allowing the inactive aluminum or its alloy to react directly with an olefin and hydrogen gas to proceed the reaction for producing an alkylaluminum compound together with the activation reaction, without especial addition of an alkylaluminum compound, in the presence of only the present catalytic substance.

Another advantageous point of the present invention is that, if desired, the objective alkylaluminum compound can be separated from the mixture of the produced alkylaluminum compound and the present catalytic substance by selecting properly the kind of the catalytic substance employed in the present invention. For example, when the catalytic substance having extremely higher boiling point than that of alkylaluminum compound produced is employed, e.g., as in the case when triisobutylaluminum, one of the alkylaluminum compounds, is manufactured in the presence of diisobutylphenoxyaluminum, one of the catalytic substances employed in the present invention, alkylaluminum compound can be easily separated from the mixture of the reaction product by simple distillation. While, the remaining present catalytic substance can be again employed by circulation as a matter of course. Accordingly, an alkylaluminum compound can be easily obtained by employing as a catalytic substance an organoaluminum compound containing an oxygen atom in the molecule, differing from the case of using a dialkylaluminum halide.

And, there is a case when such a separation by distillation is not necessary depending upon the use of the alkylaluminum compound. For example, when an aluminum alloy manufactured by reduction of bauxite is subjected to the reaction with an olefin and hydrogen gas in the presence of the present catalytic substance, whereby aluminum in the alloy is converted to an alkylaluminum compound, high purity aluminum is obtained by separating off the metal residue of the alloy from the reaction product mixture containing the alkylaluminum compound, the present catalytic substance and the metal residue, according to the known procedure such as filtration and centrifugation, and then heating the resulting mother liquid as it is up to a temperature at which the alkylaluminum compound is decomposed. The catalytic substances employed in the present invention are quite heat-stable at such temperature, accordingly only the alkylaluminum compound in the resulting liquid mixture is selectively heat-decomposed to yield aluminum, so that the remaining catalytic substance can be again employed in circulation for the production of alkylaluminum compound.

As another example, also, when an alcohol is produced by autooxidizing the mixture of the product alkylaluminum compound and the catalytic substance, it is not necessary to separate the alkylaluminum compound from the present catalytic substance. In this case, in order to obtain the alcohol consisting of single component, it is preferable to employ as the catalytic substance having the general formula of $R_2AlOR'$, the compound having the R and R' radicals corresponding to the objective alcohol.

Still further advantageous point of the present invention is that in the reaction for producing alkylaluminum compound according to the invention, the amount of saturated hydrocarbon formed is decreased due to the fact that the catalytic substance is always present.

It is considered that the saturated hydrocarbon is produced by the hydrogenation of olefin according to the Equation I, or the hydrogenation decomposition according to the Equation II.

$$\text{olefin} + H_2 \rightarrow \text{paraffin} \qquad (I)$$
$$AlR_3'' + H_2 \rightarrow AlR_2''H + R''H \qquad (II)$$

(R'' means an alkyl radical)

For example:

(a) Into an autoclave provided with a stirrer, 270 g. of commercial aluminum powder and 270 g. of triisobutylaluminum were charged and the mixture was heated up to 190° C. at a hydrogen pressure of 50 kg./cm.² for 1 hour, thereby to activate the aluminum powder. Then, 860 g. of isobutylene was charged thereto, and the reaction was conducted for 6 hours at a temperature of 120° C. and a hydrogen pressure of 100 kg./cm.².

(b) Into the similar apparatus 270 g. of commercial aluminum powder and 270 g. of diisobutylisobutoxyaluminum were charged and the mixture was heated up to 190° C. for 1 hour at a hydrogen pressure of 50 kg./cm.² thereby to activate the aluminum. Then, 860 g. of isobutylene was charged thereto, and the reaction was conducted under the similar condition as described in the case (a).

Comparing the hydrogenation rates of isobutylene in the above two cases, the values were 11% in the case (a) and 4% in the case (b), respectively, wherein the hydrogenation rate means the proportion of produced isobutane to consumed isobutylene. As is apparent from the above results, the method for manufacturing alkylaluminum compounds according to the present invention is obviously more economical due to the decrease of the formation amount of the saturated hydrocarbon i.e. the decrease of the loss of the raw olefin as compared with the method suggested by K. Ziegler et al.

One of the embodiments for carrying out the present invention is to charge an inactive aluminum or an alloy containing the same and an olefin into an autoclave provided with a stirrer and heat the mixture under the pressured state by hydrogen gas thereby to subject the mixture to the reaction. An olefin and hydrogen gas may be separately charged into the autoclave as described above or they may be charged concurrently as a mixture thereof, or each of them may be charged through the separate introducing lines. A trialkylaluminum and a dialkylaluminum hydride can be produced in various proportions, as a mixture with a catalytic substance, by adjusting the charging ratio of the olefin and hydrogen gas. In other words, when extreme excess of an olefin against hydrogen gas is charged, a product mixture almost exclusively consisting of the catalytic substance and the trialkylaluminum can be obtained, and when extreme excess of hydrogen gas against an olefin is charged, a product mixture almost exclusively consisting of the catalytic substance and dialkylaluminum hydride can be obtained. Besides the simultaneous conduction of both the processes as mentioned above, it is possible that for the first step, inactive aluminum or its alloy is activated by a heat-treatment with catalytic substance employed in the present invention, and for the second step, the activated aluminum or its alloy is subjected to the reaction with olefin and hydrogen. While, as to the activated aluminum or its alloy, those activated with catalytic substance employed in the present invention, may not always be used, but those activated by several known methods may also be used.

In the latter case, the activated aluminum or its alloy is subjected to the reaction with an olefin and hydrogen gas by addition of the present catalytic substance.

The method for carrying out the present invention is not limited to the methods mentioned above.

The catalytic substance employed in the present invention is represented by the general formula, $$R_2Al(OR')$$

wherein R and R' have the same meanings as mentioned above.

Typical examples of the catalytic substances include diethylethoxyaluminum, diethyl-n-propoxyaluminum, di-n-propyl-n-propoxylaluminum, di-n-butyl-n-butoxyaluminum, diisobutyl-n-butoxyaluminum, diisobutylisobutoxyaluminum, di-n-butylphenoxyaluminum, diisobutylphenoxyaluminum and the like.

These compounds can easily be produced by the reaction of an organoaluminum compound with an alcohol or a phenol, or by the air-oxidation of a trialkylaluminum or a triaralkylaluminum.

Aluminum and its alloys employed as material in the present invention may be any of commercially available products, such as finely divided aluminum and atomized aluminum or in various form such as shavings or cut foils from lathe and drilling machine, and cut fragments. Naturally, the aluminum and its alloy may have a film of aluminum oxide at their surface, caused by air or oxygen.

As to the aluminum alloy, the alloy including Si, Fe or Ti and others are preferably employed. In the case of Al-Si binary alloy, those having the composition of 13–60% by weight of Si and 40–87% by weight of Al, are preferred. In the case of multi-components alloys such as Al-Si-Fe, Al-Si-Ti or Al-Si-Fe-Ti, the alloys having the composition of 13–40% by weight of Si, 0–15% by weight of Fe, 0–10% by weight of Ti and the remaining amount being Al are preferred. And small amount of other metals such as Mg and Ca may be included in the alloy. Further, metals such as Al, Si and Fe or their carbide or oxide may be included in the alloy in the form of a mixture.

As to the olefin employed in the present invention, olefins having 2 to 20 carbon atoms are preferred, typical examples of which include ethylene, propylene, n- and iso-butylene, 2-methyl-1-pentene and 2-ethyl-1-hexene.

The olefins employed in the present invention may be one kind or a mixture of more than one kind.

Suitable temperature range in the present reaction is between 100° and 200° C., more preferably 120° and 150° C. The temperature of lower than 100° C. is not suitable since it remarkably makes the reaction rate lower, so it should be disadvantageous from the industrial points of view. And the temperature of higher than 200° C, is also not suitable since it brings about the decomposition of the alkylaluminum compounds.

Suitable pressure range is 50 to 300 kg./cm.² The pressure of lower than 50 kg./cm.² is not suitable by reason of lowering the reaction rate, and that of higher then 300 kg./cm.² is not suitable also by reason of complicating the reaction apparatus. The following examples are set forth merely by way of illustration and not by way of limitation.

Example 1

Into an autoclave provided with a stirrer, 270 g. of commercial aluminum powder, 270 g. of diisobutylphenoxyaluminum and 864 g. of isobutylene were charged and the mixture was heated up to 150° C., while being stirred. Then, hydrogen gas was charged into the autoclave up to 100 kg./cm.² and the reaction was continued for 8 hours, while keeping the pressure at 100 kg./cm.² by supplying hydrogen gas as the pressure of the reaction system lowered.

After the reaction was over, the pressure in the autoclave was reduced to atmospheric pressure, and the reaction mixture was taken out. Distilling the liquid product, 960 g. of diisobutylaluminum hydride, besides diisobutylphenoxyaluminum, was obtained.

Example 2

Into an autoclave provided with a stirrer, 270 g. of commercial aluminum powder and 270 g. of diisobutylisobutoxyaluminum were charged and the mixture was maintained at 150° C. for 1 hour, while being stirred, thereby to activate the aluminum powder.

After the activation was over, the reaction mixture was cooled to room temperature and 864 g. of isobutylene was charged into the autoclave and the reaction mixture was heated up to 120° C., while being stirred. Then, hydrogen gas was charged into the autoclave up to 100 kg./cm.² and the reaction was continued for 6 hours, while keeping the pressure at 100 kg./cm.² by supplying hydrogen gas as the pressure of the reaction system lowered.

After the reaction was over, the reaction mixture in the autoclave was cooled to room temperature and the pressure in the autoclave was reduced to atmospheric pressure by discharging the gas in the autoclave, and the reaction mixture was taken out. After separating the metal residue off and removing the dissolved gas, 1,230 g. of a mixture of diisobutylisobutoxyaluminum and diisobutylaluminum hydride was obtained.

Example 3

Into an autoclave provided with a stirrer, 344 g. of shaper shavings of aluminum alloy having a composition of 79.0% by weight of aluminum, 20% by weight of silicon and 1.0% by weight of iron, and 300 g. of diisobutylisobutoxyaluminum were charged and the mixture was maintained at a temperature of 150° C. for 1 hour while being stirred, thereby to activate the aluminum. After the activation was over, the reaction mixture was cooled to room temperature. Then, into the autoclave, 2,190 g. of isobutylene was charged, and the reaction mixture was heated up to 150° C. while being stirred.

Then, hydrogen gas was charged into the autoclave up to 100 kg./cm.$^2$ and the reaction was continued for 8 hours, while keeping the pressure at 100 kg./cm.$^2$ by supplying hydrogen gas as the pressure of the reaction system lowered.

In this case, a liquid product in the autoclave was a mixture of isobutylisobutoxyaluminum, diisobutylaluminum hydride and triisobutylaluminum.

After the reaction was over, the reaction mixture in the autoclave was cooled to room temperature. After discharging the gas in the autoclave, 270 g. of isobutylene was charged into the autoclave and the mixture was maintained at a temperature of 70° C. for 1 hour while being stirred. Over again, the reaction mixture in the autoclave was cooled to room temperature and the pressure in the autoclave was reduced to atmospheric pressure, by discharging the gas in the autoclave.

The liquid product was taken out and distilled, thereby to obtain 1,880 g. of triisobutylaluminum, besides diisobutylisobutoxyaluminum.

Example 4

Into an autoclave provided with a stirrer, 270 g. of commercial aluminum and 270 g. of diethylethoxyaluminum were charged and the mixture was maintained at a temperature of 150° C. for 1 hour while being stirred, thereby to activate the aluminum. After the activation was over, a mixed gas consisting of hydrogen and ethylene at the ratio of 1 to 2 was charged into the autoclave up to 150 kg./cm.$^2$ and the reaction was continued for 6 hours at a temperature of 150° C., while keeping the pressure at 150 kg./cm.$^2$ by supplying the mixed gas mentioned above as the pressure of the reaction system lowered.

After the reaction was over, the reaction mixture in the autoclave was cooled to a temperature of 70° C. and the gas in the autoclave was discharged.

Then, ethylene was charged into the autoclave up to 30 kg./cm.$^2$ and the mixture was heated for 1 hour at a temperature of 70° C.

The reaction mixture in the autoclave was cooled to room temperature and the pressure in the autoclave was reduced to atmospheric pressure, by discharging the gas in the autoclave. The liquid product was taken out and distilled, thereby to obtain 980 g. of triethylaluminum besides diethylethoxyaluminum.

What we claim is:

1. A method for directly manufacturing alkylaluminum compounds, which comprises allowing a member selected from the group consisting of aluminum and alloys containing the same, which is not yet activated, to react with an olefin and hydrogen gas in the presence of an organoaluminum compound having the general formula of R$_2$Al(OR′), wherein R represents a member selected from the group consisting of alkyl and aralkyl radicals, and R′ represents a member selected from the group consisting of alkyl, aryl, aralkyl and alkaryl radicals.

2. A method according to the claim 1, in which the said organoaluminum compound is a member selected from the group consisting of diethylethoxyaluminum, diethyl-n-propoxyaluminum, di-n-propyl-n-propoxyaluminum, di-n-butyl-n-butoxyaluminum, diisobutyl-n-butoxyaluminum, diisobutylisobutoxyaluminum, di-n-butylphenoxyaluminum and diisobutylphenoxyaluminum.

3. A method according to the claim 1, in which the said olefin is an α-olefin selected from the group consisting of ethylene, propylene, n- and isobutylenes, 2-methyl-1-pentene and 2-ethyl-1-hexene.

4. A method for directly manufacturing alkylaluminum compounds, which comprises contacting a member selected from the group consisting of aluminum and alloys containing the same, at a temperature of 100° to 200° C., with an organoaluminum compound having the general formula of R$_2$Al(OR′), wherein R represents a member selected from the group consisting of alkyl and aralkyl radicals, and R′ represents a member selected from the group consisting of alkyl, aryl, aralkyl and alkaryl radicals, thereby to activate the aluminum, and thereafter, allowing the activated aluminum to react with an olefin and hydrogen gas in the presence of the said organoaluminum compound.

5. A method according to the claim 4, in which the said organoaluminum compound is a member selected from the group consisting of diethylethoxyaluminum, diethyl-n-propoxyaluminum, di-n-propyl-n-propoxyaluminum, di-n-butyl-n-butoxyaluminum, diisobutyl-n-butoxyaluminum, diisobutylisobutoxyaluminum, di-n-butylphenoxyaluminum and diisobutylphenoxyaluminum.

6. A method according to the claim 4, in which the said olefin is an α-olefin selected from the group consisting of ethylene, propylene, n- and isobutylenes, 2-methyl-1-pentene and 2-ethyl-1-hexene.

References Cited

UNITED STATES PATENTS

| | | | |
|---|---|---|---|
| 2,787,626 | 4/1957 | Redman | 260—448 |
| 2,845,447 | 7/1958 | Carlson et al. | 260—448 |
| 2,921,876 | 1/1960 | Dobratz | 260—448 |
| 3,032,574 | 5/1962 | Ziegler et al. | 260—448 |
| 3,047,618 | 7/1962 | Selwitz | 260—448 |
| 3,076,006 | 1/1963 | Kinter | 260—448 |
| 3,294,770 | 12/1966 | Ragazzini et al. | 260—448 |
| 3,305,571 | 2/1967 | Cenker | 260—448 |

TOBIAS E. LEVOW, *Primary Examiner.*

H. M. S. SNEED, *Assistant Examiner.*